Jan. 14, 1941.  E. W. BACKES  2,228,589
BOLT TIGHTENING MACHINE
Filed Aug. 25, 1939  3 Sheets-Sheet 1
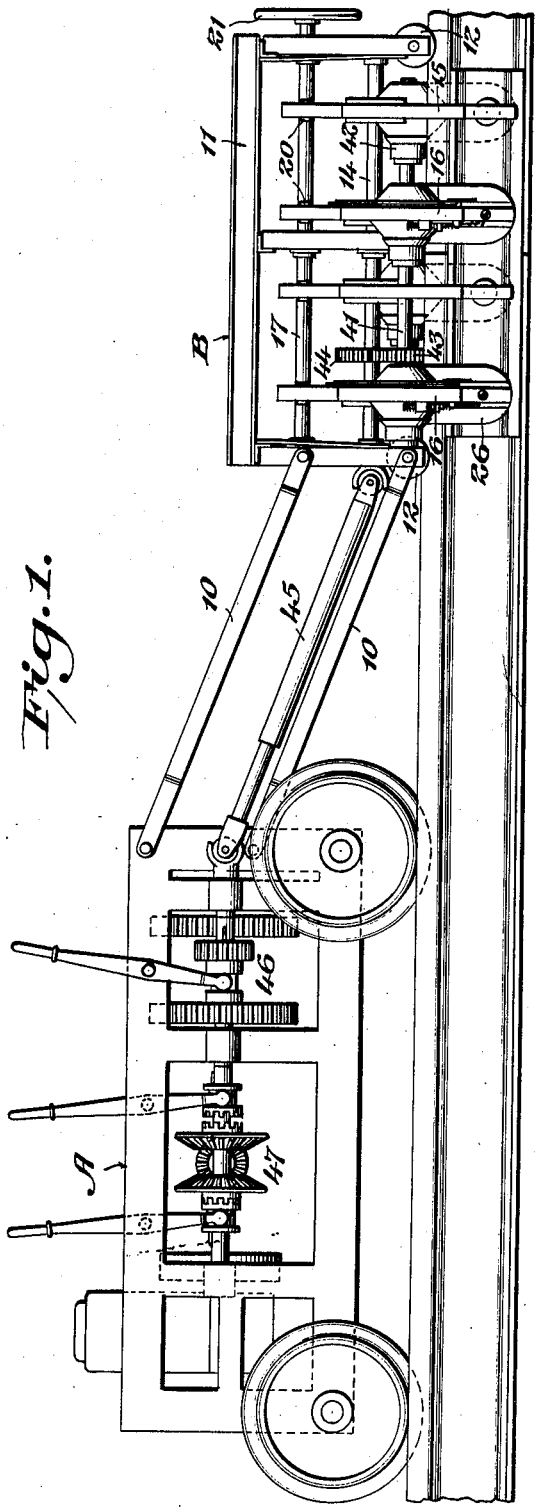

Jan. 14, 1941.  E. W. BACKES  2,228,589
BOLT TIGHTENING MACHINE
Filed Aug. 25, 1939   3 Sheets-Sheet 2
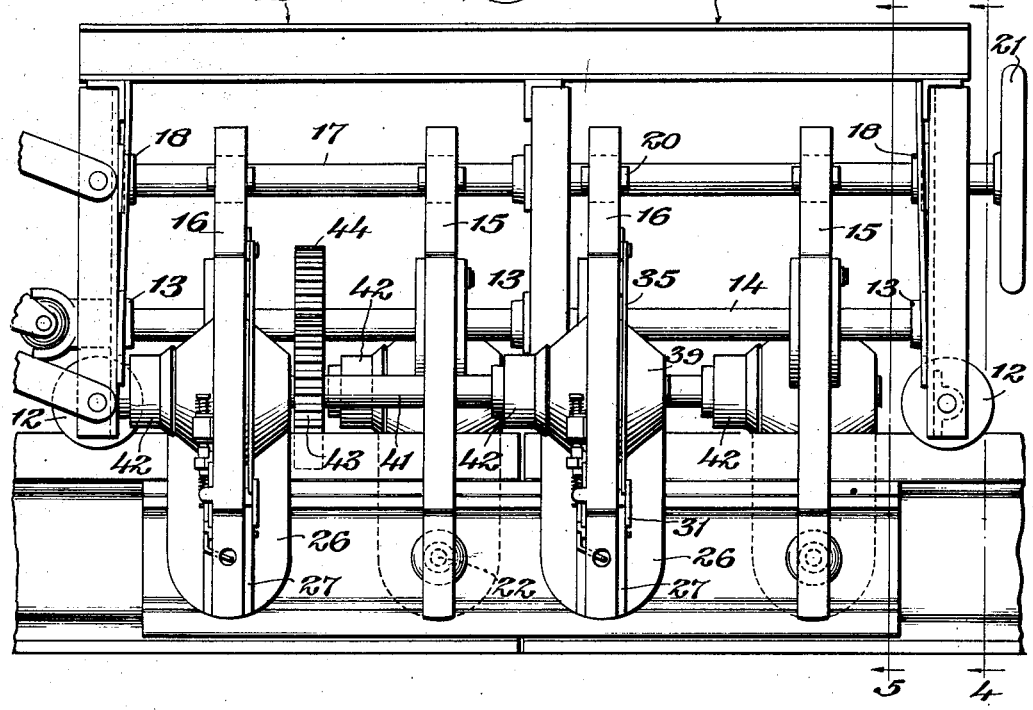
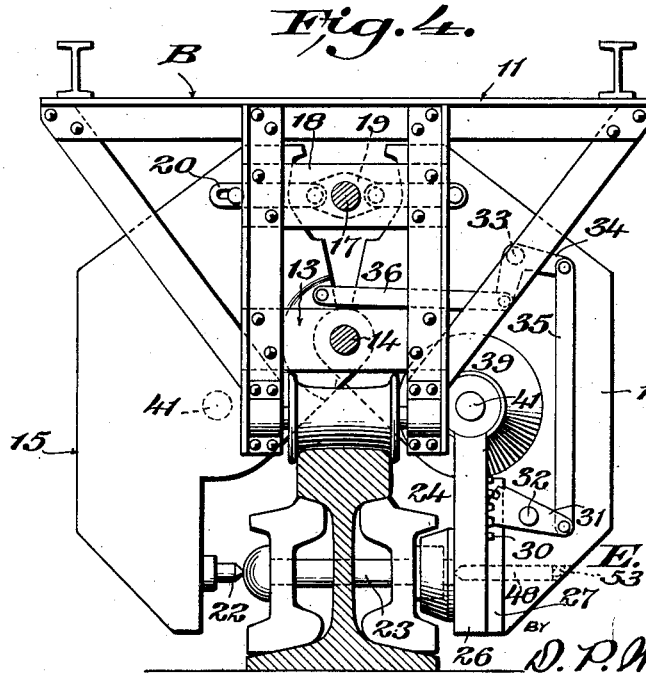
Inventor
E. W. Backes,
By D. P. Wolhaupter
Attorney

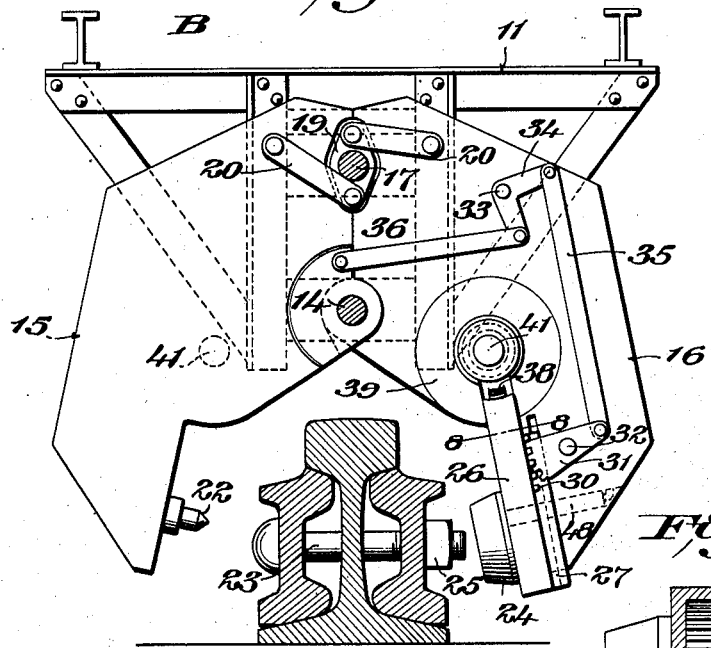
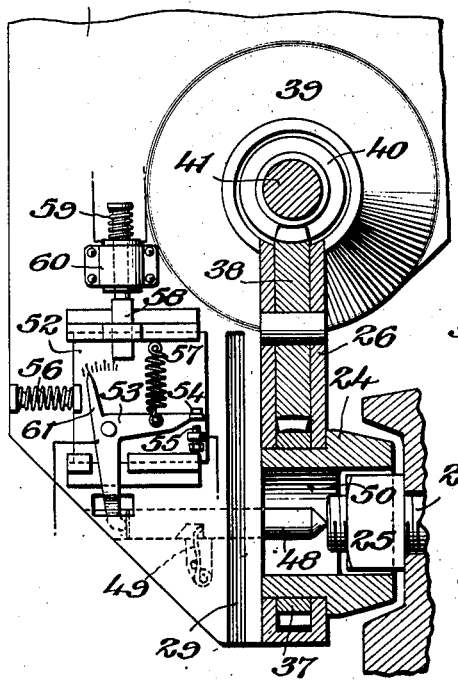
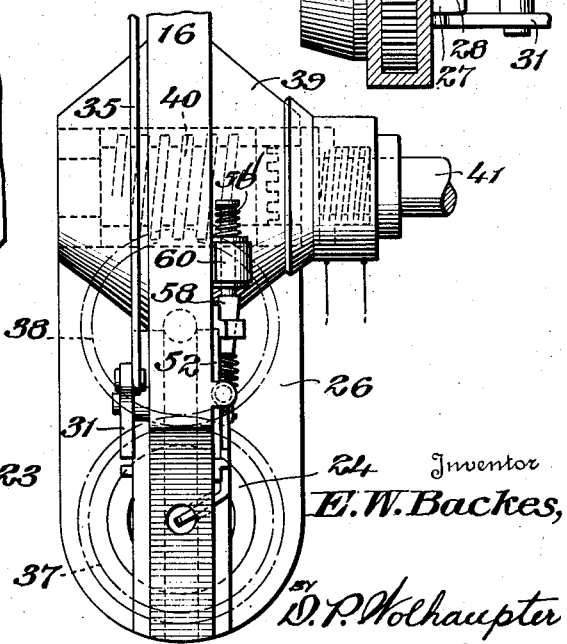

Patented Jan. 14, 1941

2,228,589

UNITED STATES PATENT OFFICE 2,228,589

BOLT TIGHTENING MACHINE

Edward W. Backes, Evanston, Ill., assignor to Poor & Company, New York, N. Y., a corporation of Delaware Application August 25, 1939, Serial No. 291,981

13 Claims. (Cl. 81—57)

This invention relates to bolt tightening machines, and has generally in view to provide a bolt tightening machine by means of which a desired tension or holding force may very accurately be set up in a bolt.

Prior bolt tightening machines usually have operated on the principle of applying a certain torque to a nut in order to obtain a desired tension or holding force in an associated bolt. Due, however, to manufacturing inequalities in different bolts of a given size and to various other causes, the torque applied to a nut is not a good gauge of the tension or holding force set up in an associated bolt. Consequently, bolts tightened by prior bolt tightening machines frequently have lacked that accuracy of tension or holding force which is so necessary in many instances to insure proper and efficient functioning of a given mechanism. An example is the rail joint art wherein it is quite important that the joint bolts should have a certain definite tension or holding force to maintain the joints tight and yet permit necessary movements between the splice bars and the rails for proper and efficient functioning of the joints.

It has been determined that when bolts of the character of rail joint bolts are tensioned amounts approximating their proper tension in service they are appreciably elongated; also, that there is very little, if any, variation in the amount of stretching or elongation of different bolts of equal diameters and lengths when same are equally tensioned. It follows, therefore, that the amount of stretching or elongation of any given bolt when placed under load is an accurate indication of its tension or holding force. Accordingly, the present invention has more particularly in view to provide a bolt tightening machine embodying means operable responsive to elongation of a bolt being tightened either to indicate the amount of elongation of the bolt as a guide for the use of the operator of the machine to determine when to stop tightening of the nut of the bolt to secure a desired tension or holding force in the bolt, or, upon a predetermined amount of elongation of the bolt, to disengage clutch means controlling tightening rotation of the nut, thus automatically to stop tightening of the bolt when a desired tension or holding force has been set up therein.

In instances where a plurality of bolts are employed to fasten elements together and where it is desirable to have all of the bolts exert equal holding forces, as, for example, in the rail joint art, it is desirable to tighten all of the bolts simultaneously, for if the bolts are tightened singly tightening of any one affects the tension or holding force previously set up in another. Accordingly, another object of the present invention is to provide a bolt tightening machine embodying means for tightening a plurality of bolts simultaneously. Further in this connection, another object of the present invention is to provide a machine which is specially adapted for tightening a plurality of rail joint bolts simultaneously.

With the foregoing and various other objects in view, which will become more fully apparent as the nature of the invention is better understood, the same consists in a bolt tightening machine embodying the various novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 1 is a side elevation of a bolt tightening machine specially constructed for use in tightening rail joint bolts, the machine being shown operatively associated with a rail joint.

Figure 2 is a top plan view of the machine as operatively associated with a rail joint.

Figure 3 is an enlarged side elevation of the bolt tightening head of the machine.

Figure 4 is a transverse section on the line 4—4 of Fig. 3.

Figure 5 is a transverse section on the line 5—5 of Fig. 3.

Figure 6 is an enlarged rear elevation of a portion of one of the jaws of the bolt tightening head of the machine.

Figure 7 is an enlarged edge view of the parts shown in Fig. 6.

Figure 8 is an enlarged cross section on the line 8—8 of Fig. 5; and

Figure 9 is a fragmentary elevation illustrating a gauge for indicating the amount of elongation of a bolt being tightened.

The bolt tightening machine illustrated in the drawings is specially designed for tightening rail joint bolts and to that end comprises a car, designated generally A, which is constructed to run upon the track rails and which suitably carries a bolt tightening head, designated generally as B, to be raised and lowered to inoperative and operative positions, respectively, relative to rail joints the bolts of which are to be tightened. It is to be understood, however, that the machine may be designed for tightening bolts other than rail joint bolts; that in either case it may be designed to tighten the bolts either singly or simultaneously, and that in different designs thereof, whether for tightening rail joint bolts or other bolts, various different features thereof, later to be described, may be used in combination with or to the exclusion of one another either in the forms illustrated in the drawings or in appropriate different but equivalent forms. In short, it is to be understood that a specific, representative embodiment of the machine merely has been chosen for purposes of facilitating a description and understanding of the features comprising the invention and that some or all of these or equivalent features may be used in machines of various different designs.

Referring now more particularly to the machine illustrated in the drawings, it will be observed that the head B is disposed in advance of the car A and is connected with said car by pairs of arms 10 whereby it is movable along the track rails with the car. It will further be observed that the arms 10 are vertically spaced apart and, together with the frames of the car and the head to which they are pivotally connected, constitute a parallelogram structure, whereby the head may be raised and lowered to clear track obstructions and whereby, in its raised or inoperative position, said head is supported by the car in a horizontal position. Obviously, a suitable lever mechanism may be provided on the car A and may be connected with the arms 10 or with the head B for raising and for controlling lowering of said head, or said head may simply be manually lifted to clear any obstruction which may be encountered along the track.

The head B includes a suitable frame, designated as 11, and carried by this frame, preferably at or near the ends thereof, are wheels or rollers 12 which, when the head is lowered, engage the head of the rail and thereby serve both to determine the lowered, operative position of the head and to support same in its operative position upon the rail.

There may be two of the heads B disposed, respectively, at opposite sides of the car A, one for tightening the bolts of the joints along one of the track rails and the other for tightening the bolts of the joints along the other track rail, or there may be only a single head B mounted either at one side of the car or medially of the car for swinging movement into operative position with respect to either track rail. In any event, the car A preferably carries a suitable power plant such as an electric motor or an internal combustion engine which may be used for the propulsion of said car and which also may be employed to furnish power for turning the nuts of the rail joint bolts to tighten the latter.

Referring now more particularly to the head B, it will be observed that the frame 11 thereof is provided with bearings 13 and that in said bearings is mounted a horizontal shaft 14 which extends longitudinally of said frame centrally thereof and has pivotally mounted thereon, at points spaced therealong corresponding to the spaced apart relationship of the bolts of a rail joint, a plurality of pairs of jaws 15 and 16 corresponding in number of pairs to the number of bolts in the rail joints with which the head B is designed for cooperation.

The jaws 15 and 16 of each pair are in the form of plates disposed vertically in a common plane transversely of the frame 11, and they are pivotally mounted intermediate their tops and bottoms and at or near their inner or adjacent edges upon the shaft 14 for inward and outward swinging movements of their top and bottom portions relative to each other.

Above and parallel to the shaft 14 is another shaft 17 which is rotatably mounted in bearings 18 carried by the frame 11 and which carries a plurality of two-arm levers 19 one related to each pair of the jaws 15, 16. Connecting the arms of each lever 19 with the jaws 15 and 16 of the related pair, respectively, are links 20, 20. Accordingly, by rotating the shaft 17 to dispose the two-arm levers 19 horizontally, the top portions of the jaws 15 and 16 of each pair are moved apart and their bottom portions are moved toward one another, while by rotating said shaft 17 to dispose said two-arm levers vertically, the top portions of said jaws are moved toward one another and their bottom portions are moved apart.

To facilitate rotation of the shaft 17 the same may be equipped at either or both ends with a hand wheel or lever or there may be a hand wheel or lever suitably mounted on the car A and suitably connected with said shaft whereby it may be rotated by an operator stationed on or near the car A. In the present instance said shaft is illustrated as being equipped at one end with a hand wheel 21.

The lower portions of the jaws 15 and 16 of each pair are spaced apart and disposed below the wheels or rollers 12 so that when said wheels or rollers are resting upon the rail the said jaws 15 and 16 of each pair are disposed at opposite sides of the rail.

Carried by one of the jaws of each pair, the jaw 15 in this instance, is a contact element 22 which is disposed for engagement with the head of a related joint bolt 23 when the head B is in its lowered, operative position supported upon the rail by the wheels or rollers 12 and the lower portions of the jaws 15, 16 are at their limit of inward swinging movement as determined by the link and lever or toggle connection between their top portions. Carried by the other jaw of each pair, the jaw 16 in this instance, is a wrench element 24 which is disposed for engagement with the nut 25 of the related bolt 23 when the head B is in its lowered, operative position and the lower portions of the jaws 15, 16 are swung inwardly.

In a rail joint the heads and the nuts of adjacent bolts are disposed at opposite sides of the joint. Accordingly, adjacent pairs of the jaws 15, 16 have their corresponding jaws disposed at opposite sides of the head B to adapt the contact elements 22 and the wrench elements 24 for cooperation with the heads and the nuts of the bolts, respectively.

The jaws 15 and 16 of the different pairs are swingably mounted as described for the purpose of engaging and disengaging the contact elements 22 and the wrench elements 24 with and from the heads and the nuts, respectively, of the bolts 23 when the head B is in its lowered, operative position. In this connection it will be understood that prior to lowering the head B to its operative position the shaft 17 is rotated to swing apart the lower end portions of the jaws 15 and 16 of the different pairs to permit lowering of said head B to its operative position, and that thereafter said shaft 17 is rotated to swing the said lower end portions of the jaws 15 and 16 of the different pairs toward one another to engage the contact elements 22 with the heads of the bolts 23 and the wrench elements 24 with the nuts of said bolts. Similarly, after tightening of the bolts of a joint, the shaft 17 is rotated to swing apart the lower end portions of the jaws 15 and 16 of the different pairs to disengage the contacts elements 22 and the wrench elements 24 from the heads and the nuts, respectively, of the bolts in order to permit raising of the head B or movement of the same along the rail in its lowered position.

The wrench elements 24 are in the form of sockets requiring substantially straight-line movements into and from engagement with their related nuts 25. Accordingly, in order to impart substantially straight-line movements to the wrench elements 24 into and from engagement with their related nuts 25 despite the arcuate swinging movements of the lower end portions of the jaws 16 carrying said wrench elements, each wrench element is mounted on a gear housing member 26 that is mounted for vertical sliding movement on its related jaw 16, and means is provided whereby swinging movements of the jaws of each pair imparts vertical sliding movements to the related gear housing member 26 in a manner such that, despite the arcuate swinging movements of the lower end portions of the jaws 16 carrying the wrench elements 24, the latter partake of substantially straight-line movements relative to their related nuts 25 during their engagement with and disengagement from said nuts.

The gear housing members 26 may be mounted in any suitable manner on their related jaws 16 for vertical sliding movements relative thereto. In the present instance each gear housing member is disposed against the flat, inner edge of the lower end portion of its related jaw 16 and is provided at opposite sides of said jaw with rearwardly extending flanges 27 which are disposed against the opposite side faces of said jaw and have inwardly extending ribs 28 (Fig. 8) slidably engaged in channels 29 in the opposite sides of said jaw. Thus, each gear housing member 26 is maintained securely in assembly with its related jaw 16 and yet is vertically slidable relative thereto.

On the rear or outer side of each gear housing member 26 is a vertical row of rack teeth 30 that are engaged by a related segmental pinion 31 disposed at one side of the related jaw 16 and pivoted thereto as indicated at 32. Disposed at the same side of each jaw 16 near the top thereof and pivoted thereto as indicated at 33 is a bellcrank lever 34 one arm of which is connected with the related pinion 31 rearwardly or outwardly of its pivot 32 by a link 35 and the other arm of which is connected by a link 36 with the related jaw 15. The arrangement in this respect is such that when the bottom portions of the jaws 15 and 16 of each pair are moved toward one another the related link and lever mechanism slides the related gear housing member 26 upwardly relative to the jaw 16 carrying the same, and when the said bottom portions of said jaws are moved apart the said gear housing member is slid downwardly relative to the jaw carrying the same. The arrangement in this respect further is such that the amount of upward or downward sliding movement of each gear housing member 26 relative to the jaw carrying the same is substantially the amount required to compensate for the arcuate swinging movements of the lower end portions of the jaws 16 so that, despite the arcuate swinging movements of the lower end portions of said jaws, the wrench elements 24 partake of substantially straight-line movements into and from engagement with their related nuts 25.

Each wrench element 24 is rotatably mounted in its gear housing 26 and is equipped with a gear 37 disposed in said housing and in mesh with a companion gear 38 also disposed in said housing. In an enlargement 39 of each jaw 16, directly above the related gear housing 26, is mounted a worm 40 (Figs. 6 and 7) with which the related gear 38, which extends at its top through the open upper end of the related gear housing member 26, meshes when said gear housing member is in its upper position relative to its related jaw. On the other hand, when the gear housing members 26 are lowered relative to the jaws 16 the gears 38 are disengaged from the worms 40.

At opposite sides of the vertical, longitudinal, medial plane of the head B is a pair of shafts 41, 41, one of which is related to the worms 40 at one side of the head B and the other of which is related to the worms 40 at the other side of said head. Each shaft 41 is horizontally disposed and extends longitudinally of the head B and is journaled in the jaws 15 and 16 at the related side of the head B. Moreover, each shaft 41 extends through its related worms 40 and is rotatable with respect thereto. Between each worm 40 and its related shaft 41 is a suitable clutch, designated generally as 42, for connecting and disconnecting each worm with and from its related shaft 41. As the particular form of the clutches 42 is immaterial so far as concerns the present invention, said clutches have not been illustrated in detail. Suffice it is to say that normally said clutches are engaged and connect the shafts 41 in driving relationship to the worms 40 and that said clutches are of a magnetic type disengageable upon closing of a circuit therethrough.

The shafts 41 each carry a gear 43 in mesh with a gear 44 on the shaft 14, which latter shaft is rotatable in its bearings 13 and also is rotatable relative to the jaws 15 and 16. Accordingly, if the bottom portions of the jaws 15 and 16 of the different pairs are in their swung apart positions and the gears 38 are disengaged from the worms 40, as illustrated in Fig. 5 of the drawings, rotation of the shaft 14, while effective to rotate the shafts 41, 41 and, consequently, the worms 40, if the clutches 42 are engaged, is not effective to rotate the wrench elements 24. On the other hand, if the bottom portions of the jaws 15, 16 of the different pairs are in their inwardly swung positions and the gears 38 thereby are engaged with the worms 40, as illustrated in Fig. 3 of the drawings, rotation of the shaft 14 is effective to rotate the shafts 41, 41 and, consequently, the worms 40 and the wrench elements 24 under the control of the clutches 42.

The shaft 14 is operatively connected with the power plant on the car A through a propeller shaft 45 and a high and low speed gear mechanism of any suitable type designated generally as 46 and also through a reversing gear of any suitable type designated generally as 47. Accordingly, power may me applied to the wrench elements 24 either at high or at low speed to screw the nuts 25 either onto or off of the bolts 23.

Slidably mounted in each jaw 16 at a point such that it axially alines with the related joint bolt 23 when the lower portion of the jaw 16 is in its inwardly swung position, is a contact element 48 which is constantly urged inwardly by a suitable spring 49 so that it contacts at its inner end with the threaded end of the bolt when the jaw 16 is in its inwardly swung position. Each wrench element 24 is bored as indicated at 50 in order to accommodate the related contact element 48 as illustrated in Fig. 6 of the drawings, and in this connection it will be noted that the bore 50 is amply large so that the contact element 48 does not interfere with vertical sliding movements of the gear housing member 26 relative to the jaw 16.

Since the jaws 15 and 16 of each pair are held by their actuating toggles against swinging relative to each other when said jaws are in their inwardly swung positions and against swinging relative to the joint bolts 23 by the engagement of the fixed contact elements 22 with the heads of said joint bolts, in the inwardly swung positions of said jaws, the contact elements 48 are engaged with the opposite ends of the related bolts 23, it follows that, as each bolt is elongated due to tightening of its nut 24, the related contact element 48 is urged outwardly relative to its jaw 16. In this connection and as previously stated, any given amount of elongation of a bolt 23 corresponds to a certain definite tension or holding force set up in said bolt. It follows, therefore, that if a suitable indicating means is connected with each movable contact element 48 to indicate the elongation of the related bolt, tightening of any given bolt may be stopped by disengaging the related clutch 42 when any desired predetermined tension or holding force has been set up in the bolt. In this connection it is obvious that the clutches 42 may be entirely mechanical and may be operable manually and that the wrench elements 24 may be either manually operable or power driven; also, that instead of a plurality of wrench elements for simultaneously tightening a plurality of bolts, only a single wrench element may be employed to tighten the bolts successively. In Fig. 9 of the drawings is illustrated a dial gauge 51 associated with the movable contact element 48' to indicate the amount of elongation of the related bolt. If the machine includes a plurality of pairs of jaws 15, 16 and associated movable contact elements there may be a dial gauge or a gauge of any other suitable type associated with each movable contact element. Obviously, the operator of the machine, by observing said gauges, is informed concerning the proper time to stop tightening of each bolt to obtain a desired tension or holding force therein.

Preferably a machine constructed in accordance with the invention includes not only a plurality of wrench elements and a power means common to all of said wrench elements for tightening all of a given number of bolts simultaneously, but means to automatically disconnect each wrench element from said power means when a desired tension or holding force has been set up in the related bolt. In this connection and referring particularly to Figs. 6 and 7 of the drawings, it will be observed that the jaw 16 has slidably mounted thereon for inward and outward movement relative thereto a plate 52, and that pivoted to said plate is a two-arm lever 53 one arm of which is engaged with the outer end of the movable contact element 48 and the other arm of which is movable between a stop 54 and an electrical contact 55 both carried by said plate 52. It will further be observed that a spring 56 lends constantly to slide the plate 52 inwardly relative to the jaw 16 and that another spring 57 tends constantly to swing the lever 53 in a direction to maintain the first mentioned arm thereof engaged with the outer end of the contact element 48 and the second mentioned arm thereof against the stop 54 and spaced from the electrical contact 55. Further, it will be observed that a wedge element 58 is associated with the plate 52 to lock same against sliding movement relative to the jaw 16; that a spring 59 tends constantly to move said wedge element to release said plate for sliding movement relative to the jaw 16 and that a solenoid 60 is provided to be energized to move said wedge to lock said plate against sliding movement.

Each of the jaws 16 is equipped with a plate 52 and associated parts as shown in Figs. 6 and 7 and the several solenoids are under a common control to be energized simultaneously. Prior to swinging of the lower end portions of the jaws 15, 16 toward one another the solenoids 60 are deenergized to release the plates 52 and to maintain them released until the lower end portions of the jaws 15, 16 have been swung inwardly to their operative positions. The springs 57 are stronger than the springs 56 so that if the contact elements 48 engage the ends of the bolts 23 and are slid outwardly relative to the jaws 16 during inward swinging movements of the latter, the levers 53 are not rotated on their pivots but remain in normal positions against the stops 54 and the plates 52 are slid outwardly relative to the jaws 16. When the lower end portions of the jaws 16 reach their limits of inward swinging movement the solenoids 60 are energized and act to shift the wedges to lock the plates 52 against sliding movements relative to the jaws 16. The electrical contacts 55 are adjustable and are spaced predetermined distances from the second mentioned arms of the levers when said levers are in their normal positions with their second mentioned arms in engagement with the stops. The said spacing of the second mentioned arms of the levers 53 from the electrical contacts 55 corresponds to the amount that said levers 53 are rotated by a predetermined amount of elongation of the joint bolts corresponding to a desired tension or holding force to be set up in the joint bolts. Each lever 53 and its related electrical contact 55 constitutes a switch controlling the related clutch 42. As the joint bolts are tightened and elongated and the contact elements 48 are, as a result, urged outwardly, the levers 53 are rotated and their second mentioned arms are caused to approach the electrical contacts 55, finally engaging said electrical contacts when a certain predetermined tension or holding force has been set up in the joint bolts. Upon engagement of the second mentioned arm of any given lever 53 with its electrical contact 55 the circuit of the related clutch 42 is closed and said clutch is actuated to disconnect the related worm 40 from the related shaft 41. Thus, tightening of each bolt ceases upon a predetermined amount of elongation thereof corresponding to a certain tension or holding force set up therein.

As will be understood, the purpose of the sliding plates 52 is to compensate for any difference in length between the respective bolts and to insure that at the beginning of any given tightening operation the second mentioned arms of the levers 53 will be spaced predetermined distances from the electrical contacts 55 depending upon the adjustments of the latter.

While it is not necessary to employ indicators in conjunction with means for automatically rendering the wrench elements 24 inoperative upon predetermined tensions or holding forces being set up in the bolts, indicators may be used in association with such means if desired. Thus, as illustrated in Fig. 6, each lever 53 may carry a pointer 61 for cooperation with a suitable scale on the related plate 52.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. A bolt tightening machine comprising a rotatable wrench element for engagement with the nut of a bolt to turn same to tighten the bolt, a supporting structure for said wrench element, and means carried by said supporting structure for indicating elongation of the bolt responsive to tightening of the same, said means including a contact element for engagement with an end of the bolt, means cooperating with said contact element whereby the latter is movable relative to said supporting structure solely in response to elongation of the bolt, and an indicator operable by movement of said contact element.

2. A bolt tightening machine comprising a rotatable wrench element for engagement with the nut of a bolt to turn same to tighten the bolt, means for rotating said wrench element, a contact element for engagement with an end of the bolt, means whereby said contact element is moved solely in response to elongation of the bolt and means operable by movement of said contact element in response to elongation of the bolt to disconnect said wrench element from its rotating means.

3. A bolt tightening machine comprising a rotatable wrench element for engagement with the nut of a bolt to turn same to tighten the bolt, power means for rotating said wrench element, a clutch between said power means and said wrench element, a contact element for engagement with an end of the bolt, means whereby said contact element is moved solely in response to elongation of said bolt, and means operable by movement of said movable contact element in response to elongation of the bolt during tightening of the same to actuate said clutch to disconnect said wrench element from said power means.

4. A bolt tightening machine comprising a pair of jaws, a rotatable wrench element carried by one of said jaws, a pair of contact elements one carried by one of said jaws and the other carried by the other of said jaws for engagement with the ends of a bolt to be tightened, said jaws being mounted for movement toward and away from each other to operatively engage and disengage said wrench element with and from the nut of the bolt and to engage and disengage said contact elements with and from the ends of the bolt, means whereby one of said contact elements is movable relative to the jaw element carrying the same solely in response to elongation of the bolt, and means operable by movement of said movable contact element responsive to elongation of the bolt to indicate the amount of elongation of the bolt during tightening of the same.

5. A bolt tightening machine comprising a pair of jaws, a rotatable wrench element carried by one of said jaws, a pair of contact elements one carried by one of said jaws and the other carried by the other of said jaws for engagement with the ends of a bolt to be tightened, said jaws being mounted for movement toward and away from each other to operatively engage and disengage said wrench element with and from the nut of the bolt and to engage and disengage said contact elements with and from the ends of the bolt, one of said contact elements being movable relative to the jaw element carrying the same responsive to elongation of the bolt, power means for rotating said wrench element to turn said nut to tighten the bolt, a clutch between said power means and said wrench element, and means operable by movement of said movable contact element responsive to a predetermined amount of elongation of the bolt to actuate said clutch to disconnect said wrench element from said power means.

6. A bolt tightening machine comprising a pair of jaws, a rotatable wrench element carried by one of said jaws, a pair of contact elements one carried by one of said jaws and the other carried by the other of said jaws for engagement with the ends of a bolt to be tightened, said jaws being pivotally mounted for swinging movement toward and away from each other to operatively engage and disengage said wrench element with and from the nut of the bolt and to engage and disengage said contact elements with and from the ends of the bolt, means operable responsive to swinging movement of said jaw elements to move said wrench element relative to the jaw carrying the same so that said wrench element partakes of substantially straight line movement relative to the bolt during swinging movement of the jaw elements to engage and disengage the wrench element with and from the nut of the bolt, one of said contact elements being movable relative to the jaw carrying the same responsive to elongation of the bolt, and means operable by said movable contact element responsive to elongation of the bolt to indicate the amount of elongation of the bolt during the tightening of the same.

7. A machine for tightening rail joint bolts comprising a car to run upon the rails, a bolt tightening head mounted on said car for vertical movement between operative and inoperative positions relative to a rail, means to support said head upon a rail in a lowered operative position relative thereto, said head comprising a frame, a pair of jaws mounted on said frame to be disposed at opposite sides of the rail, respectively, when said head is in its lowered operative position relative to the rail, a rotatable wrench element carried by one of said jaws for engagement with the nut of a rail joint bolt to turn same to tighten the bolt, a pair of contact elements one carried by one of said jaws and the other carried by the other of said jaws for engagement with the ends of the bolt, said jaws being mounted on said frame for movement toward and away from each other to operatively engage and disengage said wrench element with and from the nut of the bolt and to engage and disengage said contact elements with and from the ends of the bolt, one of said contact elements being movable relative to the jaw carrying the same responsive to elongation of the bolt, and means operable by said movable contact element responsive to elongation of the bolt to indicate the amount of elongation of the bolt during tightening of the same.

8. A machine for tightening rail joint bolts comprising a car to run upon the rails, a bolt tightening head mounted on said car for vertical movement between operative and inoperative positions relative to a rail, means to support said head upon a rail in a lowered operative position relative thereto, said head comprising a frame, a pair of jaws mounted on said frame to be disposed at opposite sides of the rail, respectively, when said head is in its lowered operative position relative to the rail, a rotatable wrench element carried by one of said jaws for engagement with the nut of a rail joint bolt to turn same to tighten the bolt, a pair of contact elements one carried by one of said jaws and the other carried by the other of said jaws for engagement with the ends of the bolt, said jaws being mounted on said frame for movement toward and away from each other to operatively engage and disengage said wrench element with and from the nut of the bolt and to engage and disengage said contact elements with and from the ends of the bolt, one of said contact elements being movable relative to the jaw carrying the same responsive to elongation of the bolt, power means carried by the car, a driving connection between said power means and said wrench element, a clutch in said connection, and means operable by said movable contact element responsive to a predetermined amount of elongation of the bolt to actuate said clutch to disconnect said wrench element from said power means.

9. A machine for tightening rail joint bolts comprising a car to run upon the rails, a bolt tightening head mounted on said car for vertical movement between operative and inoperative positions relative to a rail, means to support said head upon a rail in a lowered operative position relative thereto, said head comprising a frame, a pair of jaws mounted on said frame to be disposed at opposite sides of the rail, respectively, when said head is in its lowered operative position relative to the rail, a rotatable wrench element carried by one of said jaws for engagement with the nut of a rail joint bolt to turn same to tighten the bolt, a pair of contact elements one carried by one of said jaws and the other carried by the other of said jaws for engagement with the ends of the bolt, said jaws being pivotally mounted on said frame for swinging movement toward and away from each other to operatively engage and disengage said wrench element with and from the nut of the bolt and to engage and disengage said contact elements with and from the ends of the bolt, one of said contact elements being movable relative to the jaw carrying the same responsive to elongation of the bolt, means operable by swinging movement of said jaws to move said wrench element relative to the jaw carrying the same so that said wrench element partakes of substantially straight line movement relative to the nut during pivotal movements of the jaw elements to engage and disengage said wrench element with and from said nut, and means operable by said movable contact element responsive to elongation of the bolt to indicate the amount of elongation of the bolt during tightening of the same.

10. A machine as set forth in claim 8 in which the jaws are pivotally mounted on the frame for swinging movement toward and away from each other, and in which means are provided for moving the wrench element relative to the jaw carrying the same responsive to swinging movements of said jaws so that the wrench element partakes of substantially straight line movement relative to the nut during swinging movements of said jaw elements.

11. A machine for tightening rail joint bolts comprising a car to run upon the rails, a bolt tightening head mounted on said car for vertical movement between operative and inoperative positions relative to a rail, means to support said head upon a rail in a lowered operative position relative thereto, said head comprising a frame, a plurality of pairs of jaws mounted on said frame in spaced apart relationship therealong corresponding to the spaced apart relationship of rail joint bolts to be tightened, the jaws of each pair being arranged to be disposed at opposite sides of the rail, respectively, when the head is in its lowered operative position relative to the rail, a rotatable wrench element carried by one of the jaws of each pair for engagement with the nut of a related bolt of a rail joint to turn the nut to tighten the bolt, a pair of contact elements one carried by one jaw and the other by the other jaw of each pair for engagement with opposite ends of the related bolt, the jaws of each pair being mounted on said frame for movement toward and away from each other to operatively engage and disengage said wrench elements with and from the nuts of the joint bolts and to engage and disengage said contact elements with and from the ends of the bolts, one of the contact elements of each pair being movable relative to the jaw carrying the same responsive to elongation of the related bolt, power means carried by the car and operatively connected with all of the wrench elements, means for separately disconnecting said wrench elements from said power means, and means operable by each of said movable contact elements responsive to elongation of the related bolt to indicate the amount of elongation of the related bolt during tightening of the same.

12. A machine for tightening rail joint bolts comprising a car to run upon the rails, a bolt tightening head mounted on said car for vertical movement between operative and inoperative positions relative to a rail, means to support said head upon a rail in a lowered operative position relative thereto, said head comprising a frame, a plurality of pairs of jaws mounted on said frame in spaced apart relationship therealong corresponding to the spaced apart relationship of rail joint bolts to be tightened, the jaws of each pair being arranged to be disposed at opposite sides of the rail, respectively, when the head is in its lowered operative position relative to the rail, a rotatable wrench element carried by one of the jaws of each pair for engagement with the nut of a related bolt of a rail joint to turn the nut to tighten the bolt, a pair of contact elements one carried by one jaw and the other by the other jaw of each pair for engagement with opposite ends of the related bolt, and jaws of each pair being mounted on said frame for movement toward and away from each other to operatively engage and disengage said wrench elements with and from the nuts of the joint bolts and to engage and disengage said contact elements with and from the ends of the bolts, one of the contact elements of each pair being movable relative to the jaw carrying the same responsive to elongation of the related bolt, power means carried by the car and operatively connected with all of the wrench elements, a separate clutch between said power means and each wrench element, and means operable by each of said movable contact elements responsive to elongation of the related bolt to actuate the related clutch to disconnect the related wrench element from said power means upon a predetermined amount of elongation of the related bolt.

13. A bolt tightening machine comprising a plurality of rotatable wrench elements for engagement with the nuts of a plurality of bolts to be simultaneously tightened, a single power means for simultaneously rotating said wrench elements to simultaneously tighten said nuts, a separate clutch between each wrench element and said power means, and means for separately engaging and disengaging said clutches responsive to the tensions set up in the bolts becoming greater or lesser than certain predetermined amounts, said means including a movable contact element individual to and engageable with an end of each bolt, means cooperating with said contact elements whereby they are movable solely in response to elongation of the bolts, and a separate control connection between each contact element and a related clutch.

EDWARD W. BACKES.